2,793,997

METHOD OF INHIBITING CORROSION OF METALS

William B. Hughes, Tulsa, Okla., assignor to Cities Service Research and Development Company, New York, N. Y., a corporation of New Jersey No Drawing. Application May 17, 1954,
Serial No. 430,450

5 Claims. (Cl. 252—8.55)

This invention relates to inhibiting corrosion of metals, and is more particularly concerned with improved compositions and processes for treating natural petroleum oil-brine mixtures to reduce their corrosive action upon production, transmission, storage, and other oil field equipment.

It is a well known fact that many oil producing formations yield with the crude oil a brine which is extremely corrosive in its action upon metal tubing, pumps, and other oil production and collection equipment, and that this type of corrosion is particulary noticeable in wells producing brines containing dissolved hydrogen sulfide, carbon dioxide, and other acidic materials.

A similar problem is encountered in the production of natural gas, especially when the producing wells are high pressure wells of the type generally known as gas-condensate wells. Some water, along with condensible hydrocarbon fluids, tends to condense out of the gas and coat the walls of the gathering and distribution lines. When carbon dioxide or traces of organic acids are present in the gas, as is generally the case, they tend to dissolve in the condensed water to form highly corrosive solutions which rapidly eat their way through the lines.

I have now discovered a series of compounds which are particularly efficient in combatting corrosion in oil and gas production and transmission equipment, even when present in the fluids in concentrations as low as two parts per million.

These new compounds are formulated by mixing together equimolar quantities of a monocarboxylic acid and diethylene triamine, and heating to drive the reaction to completion and to take overhead the water formed in the reaction. Generally it is desirable to add benzene to increase the fluidity of the mixture and to aid in carrying off the water. The product obtained in this reaction is an imidazoline of the generic formula

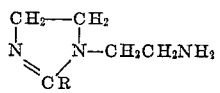

in which R is a hydrocarbon radical, the residue of the acid used. This intermediate product is then further reacted with an equimolar quantity of maleic anhydride to yield a combination of imidazoline-pyrrolinedione of the formula

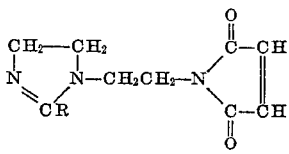

This further reaction may be accomplished simply by heating the reagents at reflux temperatures until the theoretical amount of water produced in the reaction has been driven overhead.

In order to test the effectiveness of my new compounds in combatting corrosion, the following procedure was adopted. To a one liter Erlenmeyer flask 600 ml. of a 5% aqueous sodium chloride solution and 400 ml. of depolarized kerosene was added. A steel strip was then suspended in the liquid by means of a glass hook through a rubber stopper in such a manner that half the strip was in contact with the kerosene, and the other half in contact with the aqueous layer. The stopper was equipped with a gas inlet and outlet line. Natural gas or nitrogen was then blown through the liquid for about one hour, in order to purge any oxygen present, and the inhibitor was added. Hydrogen sulfide was then blown through the liquid until it was saturated, and the flask was then sealed and allowed to stand for 48 hours. The steel strip was then removed, cleaned, and weighed to determine the weight loss due to corrosion. In all cases duplicate tests were run to determine the weight loss of strips subjected to the action of uninhibited liquids, and thus determine the effectiveness of the corrosion inhibitor. This test has been found to correlate very well with tests run with natural oil-brine mixtures.

The following table shows the result of a series of tests on some typical inhibitors of the type disclosed herein. The inhibitors all were of the generic formula given above, but were formulated with different monocarboxylic acids. Thus, inhibitor X1 was formulated with oleic acid, so that R was —$(CH_2)_7CH=CHC_8H_{17}$; X2 was formulated with acetic acid, so that R was —$CH_3$; X3 was formulated with benzoic acid, so that R was —$C_6H_5$; and X4 was formulated with stearic acid, so that R was —$C_{17}H_{35}$. The percentage corrosion in all instances is the weight loss of the strip exposed to the inhibited liquid divided by the weight loss of a strip exposed to uninhibited liquids under the same conditions. PPM is the concentration of the inhibitor in the liquids in parts per million.

Table I

| Inhibitor | P. p. m. | Percent Corrosion |
|---|---|---|
| $X_1$ | 25 | 2.9 |
|      | 10 | 6.9 |
| $X_2$ | 25 | 2.2 |
|      | 10 | 7.3 |
| $X_3$ | 25 | 12.8 |
|      | 10 | 14.3 |
| $X_4$ | 25 | 0.6 |
|      | 10 | 12.7 |

A further series of tests were run on inhibitor $X_1$ under conditions simulating those found in gas condensate wells and in gas pipelines. In this test a one inch square test panel is exposed to a corrosive medium composed of a 5% sodium chloride solution containing .02% of a mixture of formic and acetic acid, and kerosene. The temperature is held at the boiling point of water, and the test panel is caused to alternate from the water phase to the oil phase three times each minute. The test covers a period of four hours. A second test was run under similar conditions except that the hydrocarbon phase was natural gas, plus 2% kerosene based on the water. Results of these tests are given in the following table.

Table II

| | Percentage Corrosion | | | | |
|---|---|---|---|---|---|
| | 50 p. p. m. | 25 p. p. m. | 10 p. p. m. | 5 p. p. m. | 2 p. p. m. |
| Test 1 | 2.2 | 2.8 | 9.7 | 13.6 | 15.6 |
| Test 2 | 1.6 | 2.6 | 10.2 | 12.4 | 12.8 |

It will thus be evident that corrosion may be greatly reduced by the incorporation of exceedingly minute quantities of my new inhibitors into oil and gas well fluids. It has also been found that these inhibitors are highly useful in controlling the corrosion in the tanks of oil tankers, where corrosion results from the contamination of the particular product carried by sea water. In such an application addition of the inhibitors to the cargo in the amounts of 25 to 50 p. p. m. suffices to substantially inhibit corrosion.

In using my improved compositions for protecting oil well tubing, casing, and other equipment which comes in contact with the corrosive oil-brine production, I find that excellent results may be obtained by injecting an appropriate quantity of a selected composition into a producing well so that it may mingle with the oil-brine mixture and come into contact with the casing, tubing, pumps, and other producing equipment. I may, for example, introduce the inhibiting composition into the top of the casing, thus causing it to flow down into the well and then back through the tubing, etc. In general, I have found that this procedure suffices to inhibit corrosion throughout the entire system of production and collection, including field tankage. In treating gas lines, a solution of an appropriate amount of inhibitor is injected into the gas lines as near the well head as possible. The gas current flowing through the lines is then effective to mix the inhibitors with the corrosive fluids present, and to sweep the inhibitor throughout the system, affording protection to all metal equipment with which it comes in contact downstream of the point of injection.

Having now described my invention, what is claimed is:

1. The process of reducing the corrosion of metals when exposed to the corrosive action of mixtures of hydrocarbons and aqueous solutions having dissolved therein corrosive materials selected from the group consisting of metal salts, hydrogen sulfide, carbon dioxide, and water soluble organic acids which comprises incorporating into said mixture a small quantity, but sufficient to substantially inhibit corrosion, of an inhibitor having the generic formula

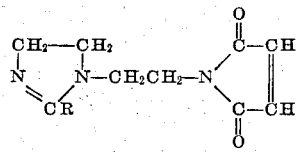

in which R is a hydrocarbon radical, and thereafter causing the inhibitor to come into contact with the metal to be protected.

2. The process according to claim 1 in which R is —(CH$_2$)$_7$CH=CHC$_8$H$_{17}$.

3. The process according to claim 1 in which R is —CH$_3$.

4. The process according to claim 1 in which R is —C$_6$H$_5$.

5. The process according to claim 1 in which R is —C$_{17}$H$_{35}$.

References Cited in the file of this patent
UNITED STATES PATENTS

| | | |
|---|---|---|
| 2,466,517 | Blair et al. | Apr. 5, 1949 |
| 2,466,530 | Blair et al. | Apr. 5, 1949 |
| 2,468,163 | Blair et al. | Apr. 26, 1949 |
| 2,646,399 | Hughes | July 21, 1953 |
| 2,675,381 | Craig et al. | Apr. 13, 1954 |